(12) United States Patent
Wang et al.

(10) Patent No.: US 8,437,437 B2
(45) Date of Patent: May 7, 2013

(54) APPARATUSES, METHODS AND COMPUTER PROGRAMS FOR CONVEYING INFORMATION

(75) Inventors: Haifeng Wang, Beijin (CN); Jiang Wang, Shanghai (CN); Jing Xu, Shanghai (CN); Bin Zhou, Shanghai (CN)

(73) Assignee: Nokia Corporation, Espoo (FI)

( * ) Notice: Subject to any disclaimer, the term of this patent is extended or adjusted under 35 U.S.C. 154(b) by 199 days.

(21) Appl. No.: 13/120,147

(22) PCT Filed: Sep. 19, 2008

(86) PCT No.: PCT/FI2008/050518
§ 371 (c)(1),
(2), (4) Date: Mar. 21, 2011

(87) PCT Pub. No.: WO2010/031893
PCT Pub. Date: Mar. 25, 2010

(65) Prior Publication Data
US 2011/0170642 A1  Jul. 14, 2011

(51) Int. Cl.
*H03D 1/04* (2006.01)
(52) U.S. Cl.
USPC .......... 375/346; 375/267; 375/135; 375/146; 370/203; 370/328; 370/334

(58) Field of Classification Search ............ 375/346, 375/267; 370/203
See application file for complete search history.

(56) References Cited

U.S. PATENT DOCUMENTS

| | | | |
|---|---|---|---|
| 7,508,880 B2* | 3/2009 | Yun et al. ............... | 375/267 |
| 7,649,831 B2* | 1/2010 | Van Rensburg et al. ...... | 370/203 |
| 8,014,265 B2* | 9/2011 | Sarkar et al. ............... | 370/203 |
| 8,179,775 B2* | 5/2012 | Chen et al. ............... | 370/203 |

* cited by examiner

*Primary Examiner* — Eva Puente
(74) *Attorney, Agent, or Firm* — Harrington & Smith

(57) ABSTRACT

The invention is related to an apparatus comprising: a receiver configured to receive a channel quality indication matrix; a processor configured to repeat, until the channel quality indication matrix is empty except for selected scheduling results, the following procedure: selecting a column of the channel quality indication matrix having the smallest number of non-zero channel quality indicators; searching for a largest channel quality indicator in the selected column of the channel quality indication matrix; selecting the searched largest channel quality indicator as a scheduling result, and emptying the column and row of the channel quality indication matrix corresponding to the selected scheduling result except for the selected scheduling result.

13 Claims, 4 Drawing Sheets

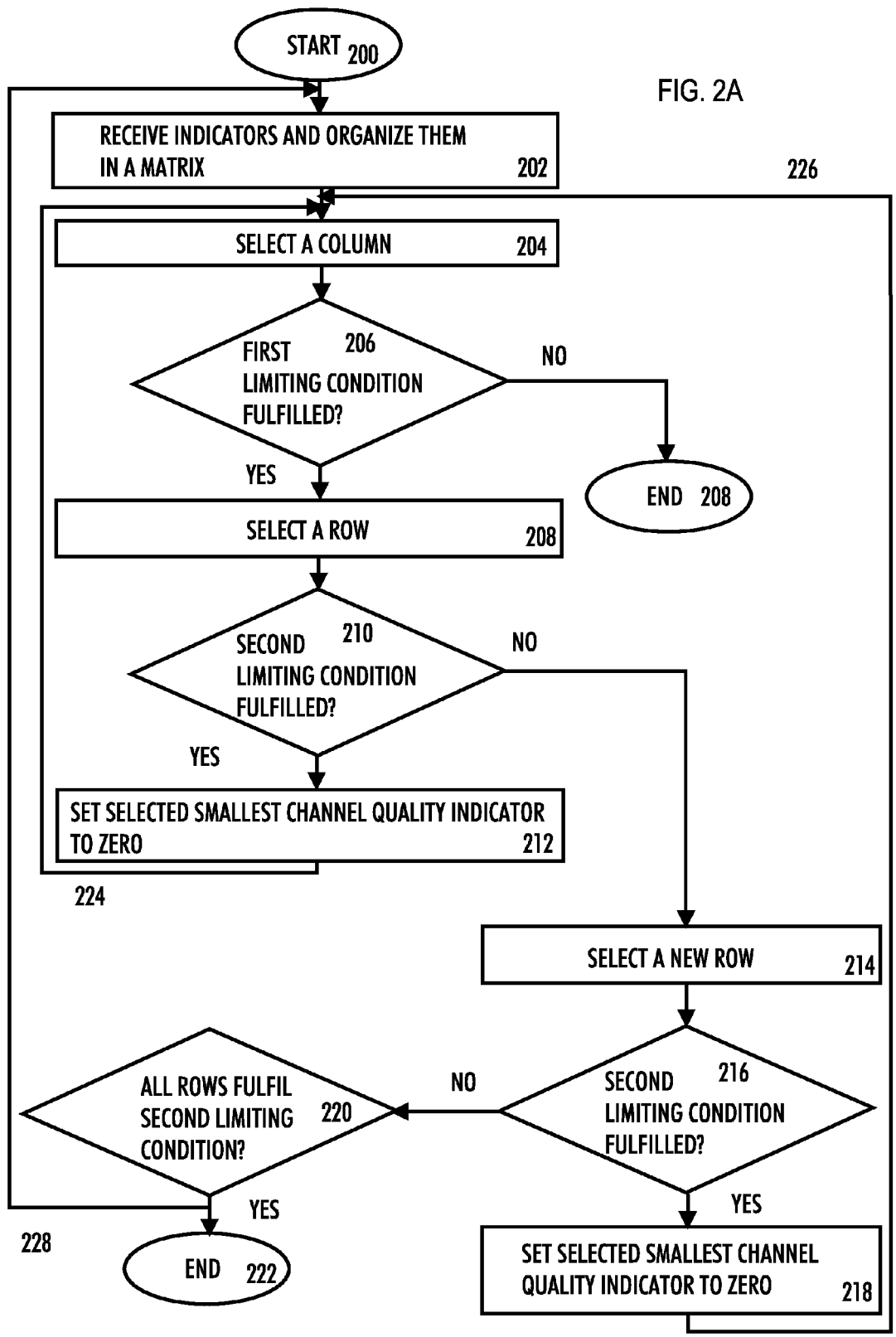

APPARATUSES, METHODS AND COMPUTER PROGRAMS FOR CONVEYING INFORMATION

RELATED APPLICATION

Figure 1:
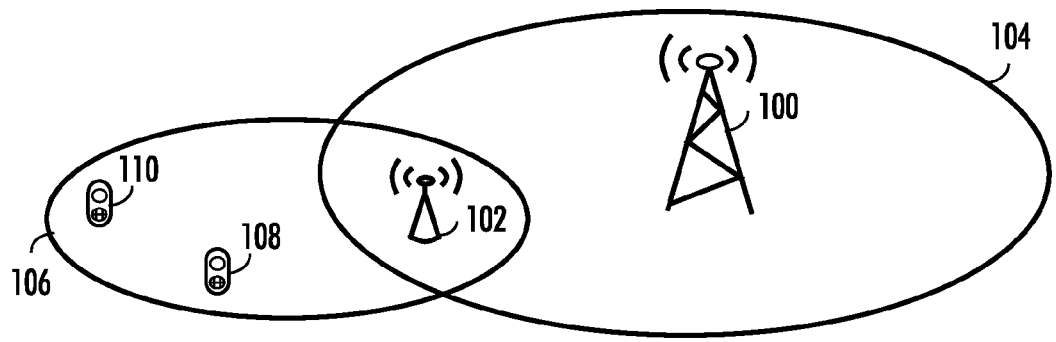

This application was originally filed as PCT Application No. PCT/FI2008/050518 on Sep. 19, 2008, which is incorporated herein by reference in its entirety.

FIELD

The invention relates to apparatuses, methods and computer programs for conveying information.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Relay technology is utilized to increase system coverage and enable higher spectrum efficiency. Relay nodes typically process the signals they forward, providing link gains.

The relay technology is typically used in an orthogonal frequency-division multiplexing (OFDM) based system. OFDM is a frequency-division multiplexing (FDM) scheme utilized as a digital multi-carrier modulation method, wherein a plurality of closely-spaced orthogonal sub-carriers is used to carry data. The data is thus divided into several parallel data streams or channels.

BRIEF DESCRIPTION

According to an aspect of the present invention, there is provided an apparatus comprising: a receiver configured to receive channel quality indicators; and a processor configured to organize the channel quality indicators in a channel quality indication matrix, and to repeat, until all rows and/or columns of the channel quality indication matrix fulfil predetermined limiting conditions set for the number of non-zero elements in a row and/or in a column of the channel quality indication matrix, the following procedure: selecting a column of the channel quality indication matrix having the largest number of non-zero channel quality indicators; if the selected column fulfils a predetermined limiting condition set for the number of non-zero elements in a column of the channel quality indication matrix, selecting a row having the smallest channel quality indicator in the selected column; if the selected row fulfils the predetermined limiting condition set for the number of non-zero elements in a row of the channel quality indication matrix, setting the selected smallest channel quality indicator to zero; otherwise selecting a row having a next smallest channel quality indicator in the selected column; and if the selected row fulfils the predetermined limiting condition set for the number of non-zero elements in a row of the channel quality indication matrix, setting the selected next smallest channel quality indicator to zero.

According to an aspect of the present invention, there is provided a method comprising: receiving channel quality indicators and organizing them in a channel quality indication matrix; repeating, until all rows and/or columns of the channel quality indication matrix fulfil predetermined limiting conditions set for the number of non-zero elements in a row and/or in a column of the channel quality indication matrix, the following procedure: selecting a column of the channel quality indication matrix having the largest number of non-zero channel quality indicators; if the selected column fulfils a predetermined limiting condition set for the number of non-zero elements in a column of the channel quality indication matrix, selecting a row having the smallest channel quality indicator in the selected column; if the selected row fulfils the predetermined limiting condition set for the number of non-zero elements in a row of the channel quality indication matrix, setting the selected smallest channel quality indicator to zero; otherwise selecting a row having a next smallest channel quality indicator in the selected column; and if the selected row fulfils the predetermined limiting condition set for the number of non-zero elements in a row of the channel quality indication matrix, setting the selected next smallest channel quality indicator to zero.

According to an aspect of the present invention, there is provided a computer program product, embodied on a computer-readable medium configured to control a processor to implement a method, the method comprising: receiving channel quality indicators and organizing them in a channel quality indication matrix; repeating, until all rows and/or columns of the channel quality indication matrix fulfil predetermined limiting conditions set for the number of non-zero elements in a row and/or in a column of the channel quality indication matrix, the following procedure: selecting a column of the channel quality indication matrix having the largest number of non-zero channel quality indicators; if the selected column fulfils a predetermined limiting condition set for the number of non-zero elements in a column of the channel quality indication matrix, selecting a row having the smallest channel quality indicator in the selected column; if the selected row fulfils the predetermined limiting condition set for the number of non-zero elements in a row of the channel quality indication matrix, setting the selected smallest channel quality indicator to zero; otherwise selecting a row having a next smallest channel quality indicator in the selected column; and if the selected row fulfils the predetermined limiting condition set for the number of non-zero elements in a row of the channel quality indication matrix, setting the selected next smallest channel quality indicator to zero.

According to an aspect of the present invention, there is provided an apparatus comprising: a receiver configured to receive a channel quality indication matrix; a processor configured to repeat, until the channel quality indication matrix is empty except for selected scheduling results, the following procedure: selecting a column of the channel quality indication matrix having the smallest number of non-zero channel quality indicators; searching for a largest channel quality indicator in the selected column of the channel quality indication matrix; selecting the searched largest channel quality indicator as a scheduling result, and emptying the column and row of the channel quality indication matrix corresponding to the selected scheduling result except for the selected scheduling result.

According to an aspect of the present invention, there is provided a method comprising: receiving a channel quality indication matrix; repeating, until the channel quality indication matrix is empty except for selected scheduling results, the following procedure: selecting a column of the channel quality indication matrix having the smallest number of non-zero channel quality indicators; searching for a largest channel quality indicator in the selected column of the channel quality indication matrix; selecting the searched channel quality indicator as a scheduling result, and emptying the column and row of the channel quality indication matrix corresponding to the selected scheduling result except for the selected scheduling result.

According to an aspect of the present invention, there is provided computer program product, embodied on a computer-readable medium configured to control a processor to implement a method, the method comprising: receiving a channel quality indication matrix; repeating, until the channel quality indication matrix is empty except for selected scheduling results, the following procedure: selecting a column of the channel quality indication matrix having the smallest number of non-zero channel quality indicators; searching for the largest channel quality indicator in the selected column of the channel quality indication matrix; selecting the searched largest channel quality indicator as a scheduling result, and emptying the column and row of the channel quality indication matrix corresponding to the selected scheduling result except for the selected scheduling result.

According to an aspect of the present invention, there is provided An apparatus comprising: means for receiving channel quality indicators and organizing them in a channel quality indication matrix; means for repeating, until all rows and/or columns of the channel quality indication matrix fulfil predetermined limiting conditions set for the number of non-zero elements in a row and/or in a column of the channel quality indication matrix, the following procedure: selecting a column of the channel quality indication matrix having the largest number of non-zero channel quality indicators; selecting a row having the smallest channel quality indicator in the selected column, if the selected column fulfils a predetermined limiting condition set for the number of non-zero elements in a column of the channel quality indication matrix; setting the selected smallest channel quality indicator to zero, if the selected row fulfils the predetermined limiting condition set for the number of non-zero elements in a row of the channel quality indication matrix, otherwise selecting a row having a next smallest channel quality indicator in the selected column; and setting the selected next smallest channel quality indicator to zero, if the selected row fulfils the predetermined limiting condition set for the number of non-zero elements in a row of the channel quality indication matrix.

According to an aspect of the present invention, there is provided an apparatus comprising: means for receiving a channel quality indication matrix; means for repeating, until the channel quality indication matrix is empty except for selected scheduling results, the following procedure: selecting a column of the channel quality indication matrix having the smallest number of non-zero channel quality indicators; searching for a largest channel quality indicator in the selected column of the channel quality indication matrix; selecting the searched largest channel quality indicator as a scheduling result, and emptying the column and row of the channel quality indication matrix corresponding to the selected scheduling result except for the selected scheduling result.

According to an aspect of the present invention, there is provided an apparatus comprising: a receiver configured to receive channel quality information values; and a processor configured to organize the received channel quality information values in a matrix, to select a column of the matrix having the largest number of non-zero channel quality information values and a row in the column having the smallest channel quality information value, provided the column and the row fulfil predetermined conditions, and to set the smallest channel quality information value to zero.

According to an aspect of the present invention, there is provided computer program product, embodied on a computer-readable medium configured to control a processor to implement a method, the method comprising: receiving channel quality information values and organizing them in a matrix; selecting a column of the matrix having the largest number of non-zero channel quality information values and a row in the column having the smallest channel quality information value, provided the column and the row fulfil predetermined conditions; and setting the smallest channel quality information value to zero.

According to an aspect of the present invention, there is provided a method comprising: receiving channel quality information values and organizing them in a matrix; selecting a column of the matrix having the largest number of non-zero channel quality information values and a row in the column having the smallest channel quality information value, provided the column and the row fulfil predetermined conditions; and setting the smallest channel quality information value to zero.

LIST OF DRAWINGS

Figure 3:
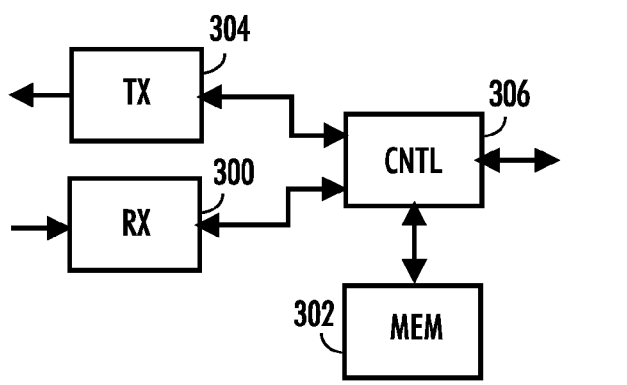
Figure 5:
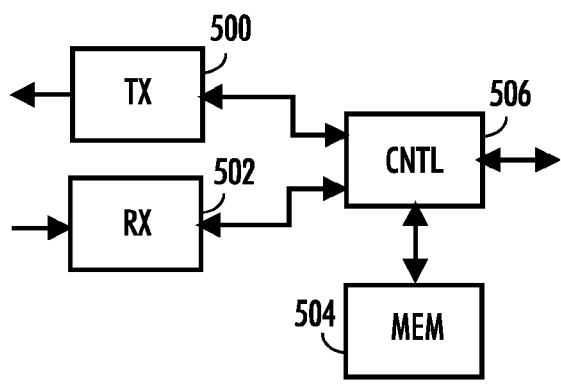
Figure 2B:
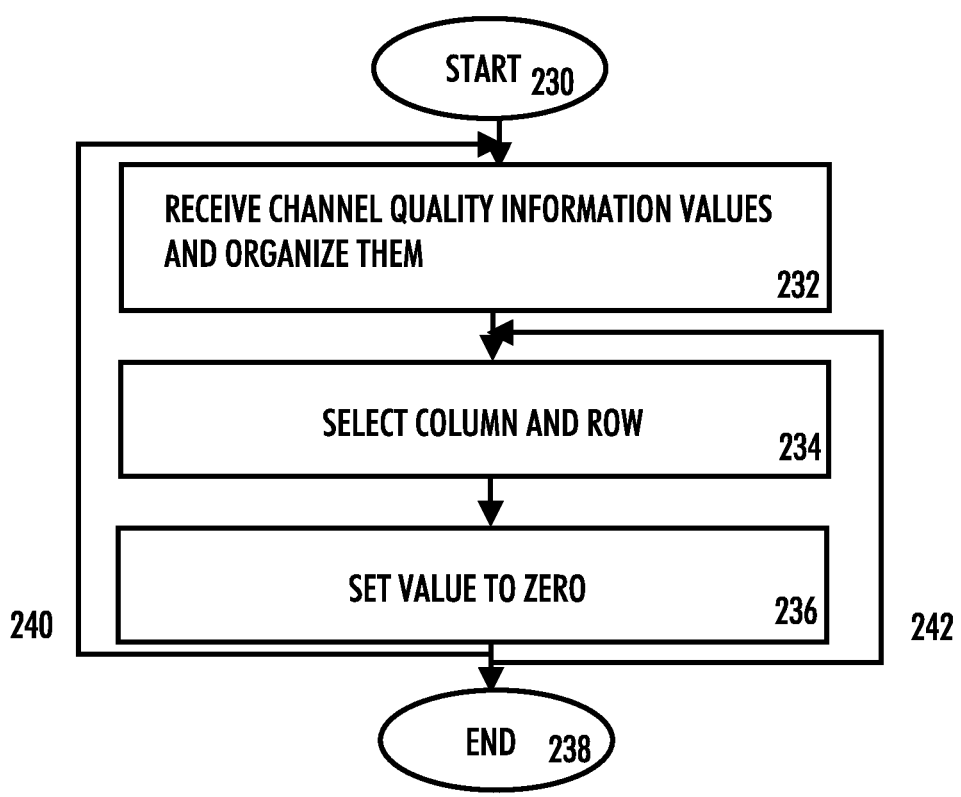
Figure 4:
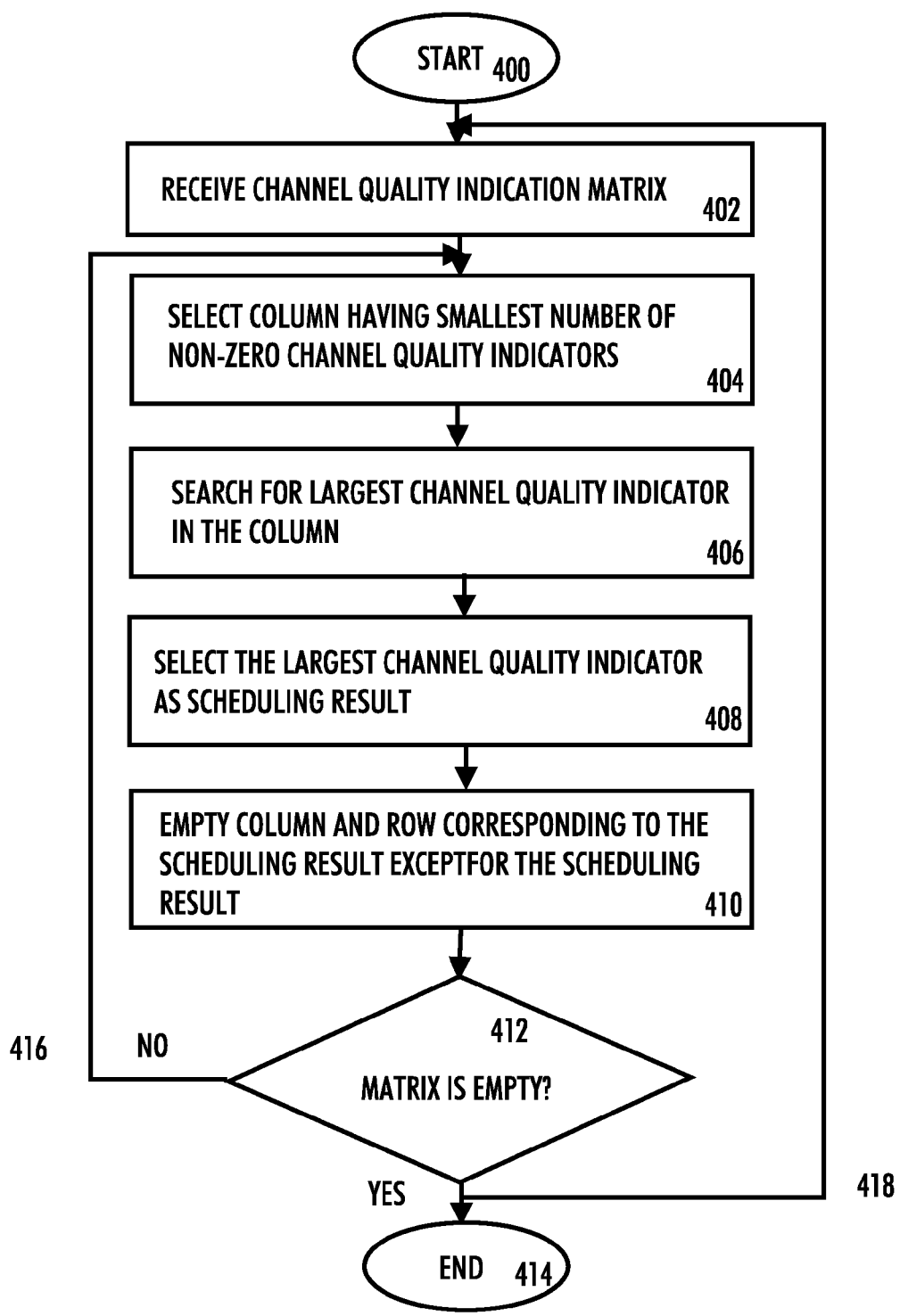

Embodiments of the present invention are described below, by way of example only, with reference to the accompanying drawings, in which FIG. 1 illustrates an example of a communication system;
FIGS. 2A and 2B are flow charts;
FIG. 3 illustrates an example of an apparatus;
FIG. 4 is another flow chart; and
FIG. 5 illustrates another example of an apparatus.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user terminal, server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems include Universal Mobile Telecommunications System (UMTS) radio access network (UTRAN or E-UTRAN), Long Term Evolution (LTE, the same as E-UTRA), Long Term Evolution Advanced (LTE-A), Wireless Local Area Network (WLAN), Worldwide Interoperability for Microwave Access (WiMAX), Bluetooth®, Personal Communications Services (PCS) and systems using ultra-wideband (UWB) technology.

In the following, different embodiments will be described using, as an example of a system architecture whereto the embodiments may be applied, an architecture based on LTE systems, without restricting the embodiment to such an architecture, however.

A general architecture of a communication system providing mobility and relay extensions is illustrated in FIG. 1.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The communications system is a cellular radio system which comprises a long-term evolution (LTE) node B (eNB) (base station) 100 which relays traffic of the communications system to other node Bs (not shown) or relay nodes 102 generating a radio cell 104. A relay node 102 generates a coverage extension 106 at the cell edge. The node-Bs or relay nodes generate radio connections to user devices 108 and 110, which may be fixed, vehicle-mounted or portable. The user devices may refer to portable computing devices. Such computing devices include wireless mobile communication devices operating with or without a subscriber identification module (SIM), including, but not limited to, the following types of devices: mobile phone, multimedia device, personal digital assistant (PDA), handset. One user device 102 is shown.

Node B (a base station) is typically further connected to a radio network controller (RNC) (not shown), which transmits the connections of the devices to other parts of the network. The radio network controller controls in a centralized manner several base stations connected to it. The radio network controller is further connected to a core network (CN). Depending on the system, the counterpart on the CN side can be a mobile services switching center (MSC), a media gateway (MGW) or a serving GPRS (general packet radio service) support node (SGSN), etc.

It should be noted that in future radio networks, the functionality of an RNC may be distributed among (possibly a subset of) base stations.

The relay node is a switching and controlling element of SAE/LTE (Long Term Evolution (LTE), System Architecture Evolution (SAE)) or other radio access networks. In SAE/LTE, Node B is called enhanced node B (eNB).

The embodiments are not, however, restricted to the system given as an example but a person skilled in the art may apply the solution to other communication systems provided with the necessary properties. Different radio protocols may be used in the communication systems to which embodiments of the invention are applicable. The radio protocols used are irrelevant to the embodiments of the invention.

The communication system is also able to communicate with other networks, such as a public switched telephone network or the Internet.

FIG. 1 further depicts an embodiment where channel quality indicators such as channel quality indications (CQIs) transmitted by the user devices are compressed in the air interface between the relay node 102 and the base station 100.

Now examples of a method for compressing channel quality information is explained by means of FIGS. 2A and 2B.

In $3^{rd}$ Generation partnership Project (3GPP) LTE, a scheme called best-M is a promising candidate for a method for conveying channel quality indication information. The best-M is a scheme, wherein user devices report channel quality indicators (CQI) for a number (a selected value marked with M) of resource blocks having the highest signal quality. The number of best channel quality resource blocks to be included in a CQI report may be dependent on the conditions of cells or user devices.

In the case of centralized scheduler based relay enhanced cellular systems, a relay node forwards CQIs of multi-hop user devices' access links to a base station. This causes quite a lot of feedback information to be received by the base station. Embodiments of the compression method according to the invention provide an option for reducing this uplink signalling.

The embodiment of FIG. 2A starts in block 200.

Typically, a first limiting condition for the number of non-zero elements (channel quality indication data elements, in this application called channel quality indicators) in a column of a channel quality indication matrix is set in an initialising phase. Such channel quality indication matrix is a matrix wherein the channel quality indicators determined by a user device are stored. The channel quality indicators are typically based on results of quality measurements made by a user device. A relay node receives the channel quality indicators from a user device.

A limiting condition is typically determined based on simulation results or other kind of numerical analysis. This is to say that a limiting condition giving the best performance is selected. The condition is a trade-off between signalling overhead and diversity gain. Typically a limiting value is a small integer value which is larger than 1, such as 2. The limiting condition is typically that the number of non-zero elements in a column of the channel quality indication matrix must exceed the limiting value or be the same. Typically, the limiting values are thus the lowest limits.

Typically, a second limiting condition for the number of non-zero elements in a row of a channel quality indication matrix is set in an initialising phase.

Such a limiting condition is typically determined based on simulation results or other kind of numerical analysis. This is to say that a limiting condition giving the best performance is selected. The condition is a trade-off between signalling overhead and diversity gain. Typically the limiting value is a small integer value which is larger than 1, such as 2. The limiting condition is typically that the number of non-zero elements in a column of the channel quality indication matrix must exceed the limiting value or be the same. Typically, such limiting values are thus typically the lowest limits.

The first and the second limiting conditions/values are also changeable remotely, if a change in the conditions so requires, or for other reasons. Typically, such limiting conditions are the lowest limits.

In block 202, channel quality indicators, such as CQIs, are received and they are organized in a channel quality indication matrix.

In the following, an example of such a matrix is given as table 1. In the system of the example, 6 user devices, 6 available resource blocks and 3 initial individual feedback resource blocks (RB) is provided per each link. L, which is a first limiting value (for the number of columns), and K, which is a second limiting value (for the number of rows), are both 2.

Resource blocks are row-wise and user devices are column-wise.

TABLE 1

| UE | RB | | | | | |
|---|---|---|---|---|---|---|
|    | 1  | 2  | 3  | 4  | 5  | 6 |
| 1 | 12 | 11 | 22 | 0  | 0  | 0 |
| 2 | 13 | 15 | 0  | 7  | 0  | 0 |
| 3 | 0  | 9  | 11 | 0  | 11 | 0 |
| 4 | 0  | 0  | 7  | 11 | 19 | 0 |
| 5 | 17 | 0  | 6  | 0  | 0  | 6 |
| 6 | 0  | 10 | 17 | 0  | 9  | 0 |

The following procedure is repeated until all rows and/or columns of the channel quality indication matrix fulfil predetermined limiting conditions set for the number of non-zero elements in a row and/or in a column of the channel quality indication matrix. The repetition is depicted by arrows 224 and 226. The check whether the limiting condition is fulfilled is carried out in block 220.

In block 204, a column of the channel quality indication matrix having the largest number of non-zero elements is selected.

In the example, the third column has the maximum number of non-zero elements.

In block 206, it is checked if the selected column fulfils a predetermined limiting condition set for the number of non-zero elements in a column of the channel quality indication matrix. If the number of non-zero elements in a column of the channel quality indication matrix exceeds the limiting value, then, in block 208, a row having the smallest channel quality indicator in the selected column is selected. It should be noted that if more than one channel quality indicators have the same largest value, whichever of them may be selected.

Otherwise, the embodiment ends and is repeated, if new channel quality indicators, such as CQIs, are received.

In the example, the smallest channel quality indicator is in the $5^{th}$ row, namely value 6.

In block 210, it is checked if the selected row fulfils the predetermined limiting condition set for the number of non-zero elements in a row of the channel quality indication matrix. If the number of non-zero elements in a row of the channel quality indication matrix exceeds the limiting value, then the selected smallest channel quality indicator is set to zero (block 212).

In the example, the matrix is now as follows (for the sake of clarity the modified channel quality indicator is written in bold):

TABLE 2

| UE | RB | | | | | |
|---|---|---|---|---|---|---|
|    | 1  | 2  | 3  | 4  | 5  | 6 |
| 1 | 12 | 11 | 22 | 0  | 0  | 0 |
| 2 | 13 | 15 | 0  | 7  | 0  | 0 |
| 3 | 0  | 9  | 11 | 0  | 11 | 0 |
| 4 | 0  | 0  | 7  | 11 | 19 | 0 |
| 5 | 17 | 0  | 0 | 0  | 0  | 6 |
| 6 | 0  | 10 | 17 | 0  | 9  | 0 |

In block 214, if the number of non-zero elements in a row of the channel quality indication matrix is below or the same as the limiting condition, then a new row having a next smallest channel quality indicator is selected.

In block 216, if the selected row fulfils a predetermined limiting condition set for the number of non-zero elements in a row of the channel quality indication matrix or, in other words, if the number of non-zero elements in a row of the channel quality indication matrix exceeds the limiting value, then the selected smallest channel quality indicator is set to zero (block 218).

Let us continue with the example.

The process proceeds to the selecting of the next column of the channel quality indication matrix having the largest number of non-zero elements. Now columns 2 and 3 are selected and the element "7" in column 3 is set to zero, after which the table is as follows:

TABLE 3

| UE | RB | | | | | |
|---|---|---|---|---|---|---|
|    | 1  | 2  | 3  | 4  | 5  | 6 |
| 1 | 12 | 11 | 22 | 0  | 0  | 0 |
| 2 | 13 | 15 | 0  | 7  | 0  | 0 |
| 3 | 0  | 9  | 11 | 0  | 11 | 0 |
| 4 | 0  | 0  | 0  | 11 | 19 | 0 |
| 5 | 17 | 0  | 0  | 0  | 0  | 6 |
| 6 | 0  | 10 | 17 | 0  | 9  | 0 |

Then the second column is selected and the element "9" is set to zero, as follows:

TABLE 4

| UE | RB | | | | | |
|---|---|---|---|---|---|---|
|    | 1  | 2  | 3  | 4  | 5  | 6 |
| 1 | 12 | 11 | 22 | 0  | 0  | 0 |
| 2 | 13 | 15 | 0  | 7  | 0  | 0 |
| 3 | 0  | 0  | 11 | 0  | 11 | 0 |
| 4 | 0  | 0  | 0  | 11 | 19 | 0 |
| 5 | 17 | 0  | 0  | 0  | 0  | 6 |
| 6 | 0  | 10 | 17 | 0  | 9  | 0 |

Next, columns 1, 2, 3, and 5 are selected. The element "9" in the $5^{th}$ column is set to zero. The matrix looks as follows:

TABLE 5

| UE | RB | | | | | |
|---|---|---|---|---|---|---|
|    | 1  | 2  | 3  | 4  | 5  | 6 |
| 1 | 12 | 11 | 22 | 0  | 0  | 0 |
| 2 | 13 | 15 | 0  | 7  | 0  | 0 |
| 3 | 0  | 0  | 11 | 0  | 11 | 0 |
| 4 | 0  | 0  | 0  | 11 | 19 | 0 |
| 5 | 17 | 0  | 0  | 0  | 0  | 6 |
| 6 | 0  | 10 | 17 | 0  | 0  | 0 |

Next, columns 1, 2 and 3 are selected. Two minimum values "11" exist in these columns, but only the first row can be selected, since only this row fulfils the predetermined limiting condition set for the number of non-zero elements in a row of the channel quality indication matrix. In other words, the number of non-zero elements in a row of the channel quality indication matrix exceeds the limiting value.

The matrix is now as follows:

TABLE 6

| UE | RB | | | | | |
|---|---|---|---|---|---|---|
|    | 1  | 2  | 3  | 4  | 5  | 6 |
| 1 | 12 | 0  | 22 | 0  | 0  | 0 |
| 2 | 13 | 15 | 0  | 7  | 0  | 0 |
| 3 | 0  | 0  | 11 | 0  | 11 | 0 |

TABLE 6-continued

| UE | RB | | | | | |
|---|---|---|---|---|---|---|
| | 1 | 2 | 3 | 4 | 5 | 6 |
| 4 | 0 | 0 | 0 | 11 | 19 | 0 |
| 5 | 17 | 0 | 0 | 0 | 0 | 6 |
| 6 | 0 | 10 | 17 | 0 | 0 | 0 |

Next, the first and third columns are selected. Now the smallest channel quality indicator values "11" in the third column and "12" in the first row do not fulfil the predetermined limiting condition set for the number of non-zero elements in a row of the channel quality indication matrix. Thus, a value which is a next smallest value is searched for: "13" in the second row is selected. The row where it is located fulfils the condition set for the number of non-zero elements. Value "13" is set to zero, and the matrix looks like:

TABLE 7

| UE | RB | | | | | |
|---|---|---|---|---|---|---|
| | 1 | 2 | 3 | 4 | 5 | 6 |
| 1 | 12 | 0 | 22 | 0 | 0 | 0 |
| 2 | 0 | 15 | 0 | 7 | 0 | 0 |
| 3 | 0 | 0 | 11 | 0 | 11 | 0 |
| 4 | 0 | 0 | 0 | 11 | 19 | 0 |
| 5 | 17 | 0 | 0 | 0 | 0 | 6 |
| 6 | 0 | 10 | 17 | 0 | 0 | 0 |

As can be seen, all the rows of the channel quality indication matrix fulfil the condition set for the number of non-zero elements in a row. Therefore the process terminates and the compression is ready. As can be seen, the signalling needed to feedback CQIs of an individual user device is reduced.

The embodiment ends in block 222. The embodiment is repeatable in several ways. Arrow 228 shows one example.

It should be noticed that the channel quality matrix is usually transmitted to another network element, such as node B.

Another embodiment of the method depicted in FIG. 2B starts in block 230. In block 232, channel quality information values (such as CQIs) are received and organized in a matrix.

In block 234, a column of the matrix having the largest number of non-zero channel quality information values and a row in the column having the smallest channel quality information value (such as CQI) are selected, provided the column and the row fulfill predetermined conditions. In block 236, the smallest channel quality information value is set to zero.

Typically, the selecting and setting are repeated until all rows and/or columns of the matrix fulfill the predetermined conditions.

If the predetermined condition is not fulfilled for the first selected row, a row having a next smallest channel quality information value is selected. The predetermined conditions are limiting conditions as described above.

The embodiment ends in block 238. The embodiment is repeatable, some examples of which is shown by means of arrows 240 and 242.

The example including matrix processing described above may also be used to explain the other embodiment.

The steps/points, signaling messages and related functions described above in FIG. 2A or 2B are in no absolute chronological order, and some of the steps/points may be performed simultaneously or in an order different from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations illustrate a procedure that may be implemented in one or more physical or logical entities. The signaling messages are only exemplary and may even comprise several separate messages for transmitting the same information. In addition, the messages may also contain other information.

An embodiment provides a computer program embodied on a distribution medium, comprising program instructions which, when loaded into an electronic apparatus, constitute an apparatus capable of carrying out the embodiments of FIG. 2A or 2B. The computer programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits.

Further, software routines may be downloaded into an apparatus. The apparatus, such as a node, or a corresponding component or a control unit as described in the examples of possible apparatus implementations which will be described below, may be configured as a computer or a microprocessor, such as a single-chip computer element, including at least a memory for providing storage area used for arithmetic operation and an operation processor for executing the arithmetic operation. An example of the operation processor includes a central processing unit. The memory may be removable memory detachably connected to the apparatus.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

FIG. 3 is a block diagram of an apparatus according to an embodiment of the invention. Although the apparatus has been depicted as one entity, different modules and memory may be implemented in one or more physical or logical entities. Such an apparatus may be a node or a host, or more precisely a relay node.

It should be appreciated that the apparatus may comprise also other units or parts. However, they are irrelevant to the actual invention and, therefore, they need not to be discussed in more detail here.

The apparatus of the example of FIG. 3 is configured to carry out the data compression described above. For this purpose, the apparatus includes a receiver 302 for receiving channel quality indicator values, a data storage 302 for storing the channel indicator values and/or the channel quality indication matrix, and a transmitter 304 for transmitting the compressed channel quality indicators to a selected network element, typically to an enhanced node B.

The receiver and the transmitter may also be combined into a transceiver.

The apparatus further includes a control unit 306 for carrying out data compression as described above. The control unit for instance organizes the channel quality indicator values in a channel quality indication matrix, selects a column of the channel quality indication matrix having the largest number of non-zero channel quality indicators, etc. The control unit is typically implemented as a computer or a microprocessor, such as a single-chip computer element and required software.

The apparatus may also be implemented as a module or chip-set comprising the functionality of the control unit, in which case the apparatus may be detachably coupled to a data storage and a transceiver, and the receiver configured to receive channel quality indicators typically means the functionality of a processor to receive data.

Another example of an apparatus comprises a receiver configured to receive channel quality information values and a processor 306 configured to organize the received channel quality information values in a matrix, to select a column of the matrix having the largest number of non-zero channel quality information values and a row in the column having the smallest channel quality information value, provided the column and the row fulfill predetermined conditions, and to set the smallest channel quality information value to zero. The channel quality information values may be CQIs.

The processor may further be configured to repeat the selecting and setting until all rows and/or columns of the matrix fulfill the predetermined conditions.

Additionally, the processor may further be configured to select a row having a next smallest channel quality information value, if the predetermined condition is not fulfilled for the first selected row.

The predetermined conditions are limiting conditions as described above.

The apparatus may also be implemented as a module or chip-set comprising the functionality of the control unit, in which case the apparatus may be detachably coupled to a data storage and a transceiver, and the receiver configured to receive channel quality information values typically means the functionality of a processor to receive data.

The compressed channel quality indication data is transmitted to a network element, typically an enhanced node B. The data is typically transmitted as a matrix. Then node B schedules resources to user devices on the basis of the quality indication data. In the following, an embodiment of a scheduling method is explained by means of FIG. 4.

The embodiment starts in block 400.

In block 402, a channel quality indication matrix is received typically from a relay node. The channel quality indication matrix is a matrix wherein channel quality indicators determined by a user device are stored. The channel quality indicators are typically based on results of quality measurements made by the user device. The relay node receives the channel quality indicators from the user device.

In block 404, a column of the channel quality indication matrix having the smallest number of non-zero channel quality indicators (matrix elements) is selected.

This is clarified by an example. The received channel quality indication matrix is the same as in Table 7.

TABLE 8

| UE | RB | | | | | |
|---|---|---|---|---|---|---|
|  | 1 | 2 | 3 | 4 | 5 | 6 |
| 1 | 12 | 0 | 22 | 0 | 0 | 0 |
| 2 | 0 | 15 | 0 | 7 | 0 | 0 |
| 3 | 0 | 0 | 11 | 0 | 11 | 0 |
| 4 | 0 | 0 | 0 | 11 | 19 | 0 |
| 5 | 17 | 0 | 0 | 0 | 0 | 6 |
| 6 | 0 | 10 | 17 | 0 | 0 | 0 |

In the example, column 6 has the smallest number of non-zero elements (channel quality indicators). Thus column 6 is selected.

In block 406, the largest channel quality indicator in the selected column of the channel quality indication matrix is searched for. It should be noted that if more than one channel quality indicators have the same largest value, whichever of them may be selected.

In the example, in the selected column 6, the element "6" is the only non-zero element.

In block 408, the searched largest channel quality indicator is selected as a scheduling result.

In the example, "6" is selected as a scheduling result for resource block 6.

In block 410, the column and row of the channel quality indication matrix corresponding to the selected scheduling result are emptied except for the selected scheduling result.

The matrix of the example looks like:

TABLE 9

| UE | RB | | | | | |
|---|---|---|---|---|---|---|
|  | 1 | 2 | 3 | 4 | 5 | 6 |
| 1 | 12 | 0 | 22 | 0 | 0 |  |
| 2 | 0 | 15 | 0 | 7 | 0 |  |
| 3 | 0 | 0 | 11 | 0 | 11 |  |
| 4 | 0 | 0 | 0 | 11 | 19 |  |
| 5 |  |  |  |  |  | 6 |
| 6 | 0 | 10 | 17 | 0 | 0 |  |

The embodiment is repeated until the channel quality indication matrix is empty except for the selected scheduling results (block 412, arrow 416).

Let us now continue with the example.

Next, the first column is selected, because it has the smallest number of non-zero elements. The element "12" is the only non-zero element which is selected as a scheduling result for resource block 1.

The column and row of the channel quality indication matrix corresponding to the selected scheduling result are emptied except for the selected scheduling result.

The matrix of the example looks like:

TABLE 10

| UE | RB | | | | | |
|---|---|---|---|---|---|---|
|  | 1 | 2 | 3 | 4 | 5 | 6 |
| 1 | 12 |  |  |  |  |  |
| 2 |  | 15 | 0 | 7 | 0 |  |
| 3 |  | 0 | 11 | 0 | 11 |  |
| 4 |  | 0 | 0 | 11 | 19 |  |
| 5 |  |  |  |  |  | 6 |
| 6 |  | 10 | 17 | 0 | 0 |  |

Now all four remaining columns have two non-zero elements. All these columns are selected. Element "19" in column 5 is the largest channel quality indicator. Thus "19" is a scheduling result for resource block 5 and the corresponding column and row are emptied except for the selected scheduling result.

TABLE 11

| UE | \multicolumn{6}{c}{RB} |
| | 1 | 2 | 3 | 4 | 5 | 6 |
|---|---|---|---|---|---|---|
| 1 | 12 | | | | | |
| 2 | | 15 | 0 | 7 | | |
| 3 | | 0 | 11 | 0 | | |
| 4 | | | | | 19 | |
| 5 | | | | | | 6 |
| 6 | | 10 | 17 | 0 | | |

Now column 4 is selected. Only one non-zero element is provided, thus "7" is selected as a scheduling result for resource block 4 and the corresponding column and row are emptied except for the selected scheduling result.

The matrix is as follows:

TABLE 12

| UE | \multicolumn{6}{c}{RB} |
| | 1 | 2 | 3 | 4 | 5 | 6 |
|---|---|---|---|---|---|---|
| 1 | 12 | | | | | |
| 2 | | | | 7 | | |
| 3 | | 0 | 11 | | | |
| 4 | | | | | 19 | |
| 5 | | | | | | 6 |
| 6 | | 10 | 17 | | | |

Next, column 2 and element "10" are selected, "10" is a scheduling result for resource block 2, and column 2 and row 6 are emptied except for the selected scheduling result.

The matrix is now as follows:

TABLE 13

| UE | \multicolumn{6}{c}{RB} |
| | 1 | 2 | 3 | 4 | 5 | 6 |
|---|---|---|---|---|---|---|
| 1 | 12 | | | | | |
| 2 | | | | 7 | | |
| 3 | | | 11 | | | |
| 4 | | | | | 19 | |
| 5 | | | | | | 6 |
| 6 | | 10 | | | | |

All the columns have only one non-zero element, which means that the scheduling is terminated.

The embodiment ends in block 414. The embodiment is repeatable in a plurality of ways, for instance for a new channel quality indication matrix as shown by arrow 418.

The steps/points, signaling messages and related functions described above in FIG. 4 are in no absolute chronological order, and some of the steps/points may be performed simultaneously or in an order different from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations illustrate a procedure that may be implemented in one or more physical or logical entities. The signaling messages are only exemplary and may even comprise several separate messages for transmitting the same information. In addition, the messages may also contain other information.

An embodiment provides a computer program embodied on a distribution medium, comprising program instructions which, when loaded into an electronic apparatus, constitute an apparatus capable for carrying out the embodiment of FIG. 4. The computer programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits.

Further, software routines may be downloaded into an apparatus. The apparatus, such as a node, or a corresponding component or a control unit of examples of possible apparatus implementations which will be described below, may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

FIG. 5 is a block diagram of an apparatus according to an embodiment of the invention. Although the apparatus has been depicted as one entity, different modules and memory may be implemented in one or more physical or logical entities. The apparatus is typically a node or a host, or more precisely node B or a base station.

It should be appreciated that the apparatus may comprise also other units or parts. However, they are irrelevant to the actual invention and, therefore, they need not to be discussed in more detail here.

The apparatus of the example of FIG. 5 is configured to carry out the resource scheduling described above. For this purpose, the apparatus includes a receiver 500 for receiving a channel quality indication matrix typically from a relay node. The channel quality indication matrix is a matrix wherein channel quality indicators determined by a user device are stored. The channel quality indicators are typically based on results of quality measurements made by the user device. The relay node receives the channel quality indicators from the user device. The channel quality indicator matrix may be stored in a data storage 504.

The apparatus further includes a transmitter 502 for transmitting the scheduling information, usually to a relay node.

The receiver and the transmitter may also be combined into a transceiver.

The apparatus further includes a control unit 506 for carrying out resource scheduling as described above. The control unit is typically implemented as a computer or a microprocessor, such as a single-chip computer element and required software. An example of a location of the control unit is a digital signal processing (DSP) processor.

The apparatus may also be implemented as a module or chip-set comprising the functionality of the control unit, in which case the apparatus is detachably coupled to a data storage and a transceiver, and the receiver configured to receive a channel quality indication matrix typically means the functionality of a processor to receive data.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that as technology advances, the inventive concept may be implemented in various ways. The invention and its embodiments are not limited to the examples described above but may vary within the scope of the claims.

The invention claimed is:

1. An apparatus comprising:
   at least one processor; and
   at least one memory including computer program code, wherein
   the at least one memory and the computer program code configured to, with the at least one processor, cause the apparatus to perform at least the following:
   receive channel quality indicators;
   organize the channel quality indicators in a channel quality indication matrix;
   repeat a procedure until at least one of all rows and columns of the channel quality indication matrix fulfil a predetermined condition set for a number of non-zero elements in one of rows and columns of the channel quality indication matrix, the procedure comprises to:
   select a column of the channel quality indication matrix having a largest number of non-zero channel quality indicators;
   if the selected column fulfils a predetermined condition set for the number of non-zero elements in a column of the channel quality indication matrix, select a row having a smallest channel quality indicator in the selected column;
   if the selected row fulfils the predetermined condition set for the number of non-zero elements in a row of the channel quality indication matrix, set the selected smallest channel quality indicator to zero;
   otherwise select another row having a next smallest channel quality indicator in the selected column; and
   if the selected another row fulfils the predetermined condition set for the number of non-zero elements in a row of the channel quality indication matrix, set the selected next smallest channel quality indicator to zero.

2. The apparatus of claim 1, wherein the at least one of the predetermined conditions comprises a value defining the lowest limit for the number of non-zero elements.

3. The apparatus of claim 2, wherein at least one of the values is an integer value larger than 1.

4. The apparatus of claim 1, wherein the at least one memory and the computer program code further configured to, with the at least one processor, cause the apparatus to transmit the channel quality matrix to another network element.

5. The apparatus of claim 1, wherein the apparatus being comprised in a relay node.

6. An apparatus comprising:
   at least one processor; and
   at least one memory including computer program code, wherein
   the at least one memory and the computer program code configured to, with the at least one processor, cause the apparatus to perform at least the following:
   receive a channel quality indication matrix;
   repeat a procedure until the channel quality indication matrix is empty except for selected scheduling results, the procedure cause the apparatus to:
   select a column of the channel quality indication matrix having a smallest number of non-zero channel quality indicators;
   search for a largest channel quality indicator in the selected column of the channel quality indication matrix;
   select the searched largest channel quality indicator as a scheduling result; and
   empty the column and row of the channel quality indication matrix corresponding to the selected scheduling result except for the selected scheduling result.

7. The apparatus of claim 6, wherein the channel quality indication matrix is received from a relay node and the channel quality indication matrix comprises channel quality indicators determined by at least one user device.

8. The apparatus of claim 6, wherein the apparatus being comprised in a base station.

9. A method comprising:
   receiving a channel quality indication matrix;
   repeating a procedure until the channel quality indication matrix is empty except for selected scheduling results, the procedure cause an apparatus to:
   selecting a column of the channel quality indication matrix having the smallest number of non-zero channel quality indicators;
   searching for a largest channel quality indicator in the selected column of the channel quality indication matrix;
   selecting the searched channel quality indicator as a scheduling result, and
   emptying the column and row of the channel quality indication matrix corresponding to the selected scheduling result except for the selected scheduling result.

10. The method of claim 9, wherein the channel quality indication matrix is received from a relay node and the channel quality indication matrix comprises channel quality indicators determined by at least one user device.

11. An apparatus comprising:
    at least one processor; and
    at least one memory including computer program code, wherein
    the at least one memory and the computer program code configured to, with the at least one processor, cause the apparatus to perform at least the following:
    receive channel quality information values; and organize the received channel quality information values in a matrix;

select a column of the matrix having a largest number of non-zero channel quality information values and a row in the matrix having a smallest channel quality information value, provided the column and the row fulfil predetermined conditions; and set the smallest channel quality information value to zero.

12. The apparatus of claim 11, wherein the at least one memory and the computer program code further configured to, with the at least one processor, cause the apparatus to repeat the selecting and setting until at least one of all rows and columns of the matrix fulfil the predetermined conditions.

13. The apparatus of claim 11, wherein the at least one memory and the computer program code configured to, with the at least one processor, cause the apparatus to select a row having a next smallest channel quality information value, if the predetermined condition is not fulfilled for the first selected row.

* * * * *